United States Patent
Pan et al.

(10) Patent No.: US 7,405,894 B2
(45) Date of Patent: Jul. 29, 2008

(54) FREQUENCY, PHASE, AND GAIN ESTIMATION TECHNIQUE FOR USE IN A READ CHANNEL RECEIVER OF A HARD DISK DRIVE

(75) Inventors: Chengzhi Pan, Santa Ana, CA (US); Andrei Vityaev, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 326 days.

(21) Appl. No.: 10/887,544

(22) Filed: Jul. 8, 2004

(65) Prior Publication Data

US 2006/0007571 A1 Jan. 12, 2006

(51) Int. Cl.
G11B 5/09 (2006.01)
(52) U.S. Cl. .............................. 360/51; 360/29; 360/65; 360/68
(58) Field of Classification Search ....................... None
See application file for complete search history.

(56) References Cited

U.S. PATENT DOCUMENTS

| | | | | |
|---|---|---|---|---|
| 5,001,724 A | * | 3/1991 | Birgenheier et al. | 375/226 |
| 5,202,842 A | * | 4/1993 | Suzuki | 702/151 |
| 5,297,185 A | * | 3/1994 | Best et al. | 375/368 |
| 5,341,249 A | * | 8/1994 | Abbott et al. | 360/46 |
| 5,835,295 A | | 11/1998 | Behrens | |
| 6,023,386 A | * | 2/2000 | Reed et al. | 360/51 |
| 6,122,117 A | * | 9/2000 | Aikawa | 360/29 |
| 6,204,988 B1 | * | 3/2001 | Codilian et al. | 360/75 |
| 6,239,934 B1 | * | 5/2001 | Sun et al. | 360/69 |
| 6,704,156 B1 | * | 3/2004 | Baker et al. | 360/75 |
| 6,980,389 B1 | * | 12/2005 | Kupferman | 360/77.08 |
| 6,989,956 B2 | * | 1/2006 | Takaishi et al. | 360/77.04 |
| 7,054,088 B2 | * | 5/2006 | Yamazaki et al. | 360/65 |

OTHER PUBLICATIONS

R.E. Blahut, "Digital Transmission of Information," pp. 396-438, Addison-Wesley, 1990, USA.
Roy D. Cideciyan, et al., "A PRML System for Digital Magnetic Recording," IEEE Journal on Selected Areas in Communications, Jan. 1992, pp. 38-56, vol. 10, No. 1, USA.

* cited by examiner

Primary Examiner—Hoa T. Nguyen
Assistant Examiner—Dismery E Mercedes
(74) Attorney, Agent, or Firm—McAndrews, Held & Malloy, Ltd.

(57) ABSTRACT

One or more methods and systems are presented for performing gain and timing acquisition of data read from one or more data sectors of a hard disk drive. The gain and timing information may be used to synchronize a read channel receiver of the hard disk drive to the data read from the data sector(s). In a representative embodiment, the one or more methods comprises determining one or more frequency and phase offsets using one or more preambles of one or more data sectors residing in a hard disk drive. In a representative embodiment, the gain of the one or more preambles may be determined. In another representative embodiment, the one or more systems used to determine one or more phase and frequency offsets, and amplitudes, comprise hardware and/or software capable of utilizing a sequence of consecutive samples provided by one or more preambles of one or more data sectors.

23 Claims, 5 Drawing Sheets

| Preamble 104 | Sync #1 108 | Data#1 112 | Sync #2 116 | Data #2 120 | Post-amble 124 |

FIGURE 1

FREQUENCY, PHASE, AND GAIN ESTIMATION TECHNIQUE FOR USE IN A READ CHANNEL RECEIVER OF A HARD DISK DRIVE

BACKGROUND OF THE INVENTION

When data is read from a hard disk drive, the read channel must be adequately synchronized so that it may correctly read the data stored in the hard disk drive. In addition, the receiver gain must be adjusted in order to properly read the data. The presence of noise may significantly affect the ability of the data to be properly read when inadequate gain control and timing recovery mechanisms are implemented. In such an instance, the performance of the hard disk drive may be significantly affected.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide for one or more methods and systems for acquiring gain and timing information from one or more preambles of one or more data sectors of a hard disk drive. The gain and timing information is used to optimize performance of the read channel receiver as it reads data stored in the hard disk drive.

In a representative embodiment, a method of synchronizing a read channel of a hard disk drive, in reference to data that is read by the read channel, comprises first generating two or more preliminary phase estimates based on one or more preambles of one or more data sectors in the hard disk drive, second generating a frequency offset and a phase offset by applying linear regression to the two or more preliminary phase estimates, and using the frequency offset and the phase offset to perform the synchronizing.

In a representative embodiment, a method of determining a frequency offset and phase offset associated with reading data from a data sector of a hard disk drive comprises first generating one or more consecutive samples obtained from a preamble of the data sector of the hard disk drive, second generating two or more preliminary phase estimates using the one or more consecutive samples, applying linear regression techniques using the two or more preliminary phase estimates, and computing the frequency offset and the phase offset using one or more registers.

In a representative embodiment, a method of determining a frequency offset and a phase offset during reading of a data sector of a hard disk drive comprises determining sine and cosine projections using a number of consecutive samples obtained from a preamble of the data sector of the hard disk drive, using the sine and cosine projections to generate two or more preliminary phase estimates, and using linear regression to generate the frequency offset and the phase offset using the two or more preliminary phase estimates.

In a representative embodiment, a method of estimating the gain or amplitude of a data stream read by a read channel receiver of a hard disk drive comprises determining one or more sine and cosine projections of a number of consecutive samples of one or more preambles of one or more data sectors in the hard disk drive.

In a representative embodiment, a system for synchronizing a read channel of a hard disk drive comprises a first circuitry and/or software used to compute preliminary phase offset estimates using a sequence of consecutive data samples obtained by sampling a preamble of a data sector of the hard disk drive, and a second circuitry used to compute frequency and phase offsets using two or more of the preliminary phase offset estimates.

In a representative embodiment, a system for determining gain or amplitude of a data stream that is read from a data sector of a hard disk drive comprises a first circuitry and/or software used to compute sine and cosine projections of a sequence of consecutive samples. In this representative embodiment, the sequence is obtained from sampling a preamble of the data sector wherein the sampling occurring at fixed time intervals.

These and other advantages, aspects, and novel features of the present invention, as well as details of illustrated embodiments thereof, will be more fully understood from the following description and drawings.

BRIEF DESCRIPTION OF THE DRAWINGS

FIG. 1 is a block diagram of an organizational structure of a sector of data that is read by a read channel receiver in a hard disk drive, in accordance with an embodiment of the invention.

DETAILED DESCRIPTION OF THE INVENTION

Figure 2:
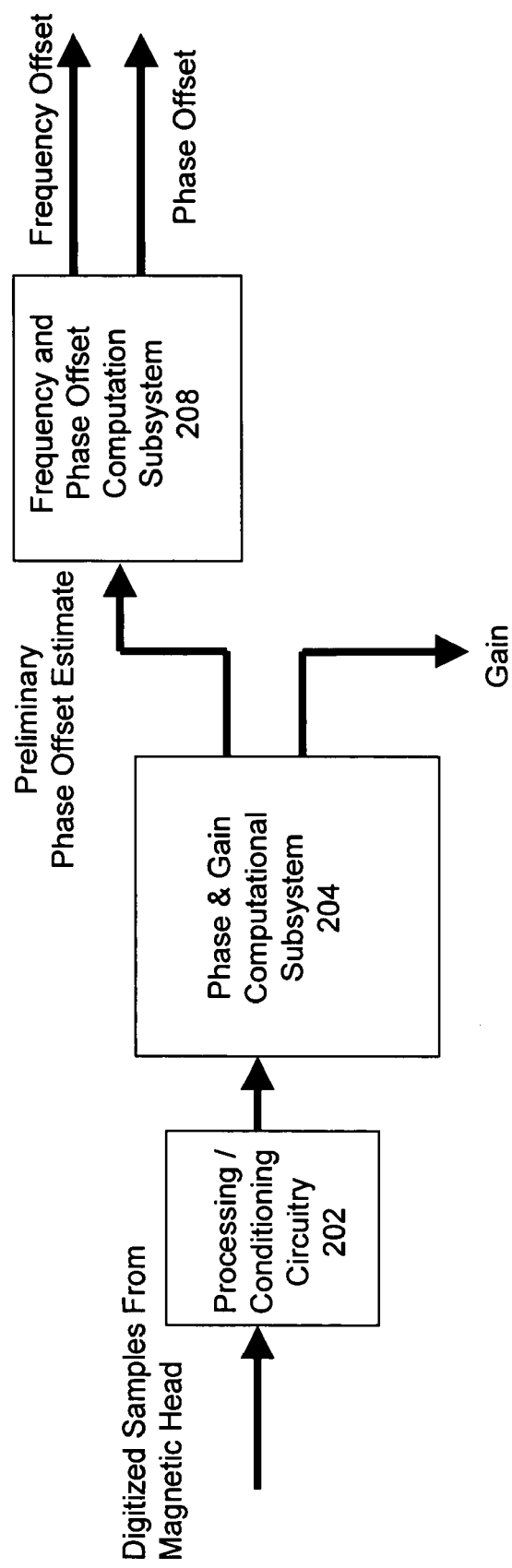
FIG. 2 illustrates a block diagram of a system in a read channel receiver of a hard disk drive, used to determine gain, frequency offset, and phase offset, in reference to a data stream, in accordance with an embodiment of the invention.

Aspects of the invention provide for one or more methods and systems for acquiring gain and timing information from one or more preambles of one or more data sectors of a hard disk drive. The gain and timing information is used to optimize performance of the read channel receiver as it reads data stored in the hard disk drive. Aspects of the one or more methods and systems improve the performance of a hard disk drive. The performance is improved by implementing an improved system and method of acquiring timing and gain information/parameters by the read channel receiver of the hard disk drive. Aspects of the invention employ one or more systems and methods of determining the frequency and phase offsets of a hard disk drive read channel, used for timing and gain acquisition in the read channel receiver. The one or more systems and methods utilize the data provided by each preamble of a data sector in a hard disk drive. The frequency and phase offsets are used to more accurately synchronize the read channel to the data stream being read. In addition, aspects of the invention provide an estimate of the amplitude or gain of the read data stream. In a representative embodiment, use of various aspects of the invention allow a reduction in the number of bytes used in one or more preambles of one or more sectors of data, thereby improving performance and the storage capacity of the hard disk drive.

FIG. 1 is a block diagram of an organizational structure of a sector of data that is read by a read channel receiver in a hard disk drive, in accordance with an embodiment of the invention. As illustrated, the sector comprises one or more sections. The one or more sections comprises a preamble field 104, a first sync field 108, a first data stream field 112, a second sync field 116, a second data stream field 120, and a post-amble field 124. The preamble field 104 may comprise one or more bytes that are used for timing recovery or synchronization of the following one or more data streams. The one or more data streams are read by the read channel receiver. Typically, the preamble field 104 comprises 15 bytes. In a representative embodiment of the invention, the preamble field 104 comprises less than 15 bytes. In a representative embodiment of the invention, the preamble field 104, used to synchronize to the data stream, comprises 6 bytes. Aspects of the invention provide a reduction in the number of bytes utilized in each of the preambles of each of the preamble fields 104 of each sector so as to increase the overall data storage capacity of the magnetic hard disk drive. In a typical implementation, a byte of the preamble comprises the sequence of bits "11001100", corresponding to a sinewave. The byte represents two periods of the sinewave. The first sync field 108 contains one or more bytes that notifies the read channel receiver or other circuitry that data immediately follows. The first data stream field 112 contains a first stream of data bytes that is read by the magnetic hard disk drive. In this representative embodiment, the first data stream field 112 is followed by a second sync field 116. The second sync field 116 is used to notify or indicate the start of another section of data. The second data stream field 120 contains a second stream of data bytes. The second data stream field 120 is followed by a post-amble field 124 used to indicate that the end of the one or more data streams has been reached for the sector.

FIG. 2 illustrates a block diagram of a system in a read channel receiver of a hard disk drive, used to determine gain, frequency offset, and phase offset, in reference to a data stream, in accordance with an embodiment of the invention. The system comprises a processing/conditioning subsystem 202, phase and gain computational subsystem 204, and a frequency and phase offset computational subsystem 208. One or more preamble samples are provided by a read magnetic head (or transducer head) of the read channel receiver, after being digitized. Typically, the read magnetic head outputs a sinusoidal signal when the magnetic disk media is read. The sinusoidal signal is output to the processing/conditioning subsystem 202, which may comprise the following sequence of components: a preamplifier, an analog processing and/or conditioning circuitry, an analog to digital converter, and a digital processing and/or conditioning circuitry. The processing/conditioning subsystem 202 may receive the sinusoidal signal output by the read magnetic head so as to process, condition, and sample the sinusoidal signal into digitized samples for input into the phase and gain computational subsystem 204. The sequence of digitized samples may be represented by the following equation:

$$y(k)=\alpha \cdot \sin 2\pi[(f_0+\Delta f)k+\theta_0]+n_0(k), |\Delta f/f_0|<<1 \quad (1)$$

In equation (1), the variable, a, represents amplitude, $f_0$ represents an a priori known center frequency, k represents integer variable that indexes the one or more digital samples provided to the phase and gain computational subsystem 204, while $n_0$ represents noise. We assume that $f_0=1/N$ where N is an integer divisible by 4. Aspects of the invention provide for at least a system and a method of estimating the phase offset, $\theta_0$ and the frequency offset $\Delta f$, by way of determining $\hat{\theta}_0$, the estimate of the phase offset, and $\Delta \hat{f}$, the estimate of the frequency offset.

Aspects of the invention utilize a sequence of digitized samples, represented by equation (1), that are input into the phase and gain computational subsystem 204. In a representative embodiment, N=4, or the number of samples in one period equals four digitized samples, (e.g., the bits 1100) corresponding to one period of the sinewave previously mentioned in reference to FIG. 2. In a representative embodiment, the number of digitized samples utilized by the phase and gain computational subsystem 204 comprises 8 samples, which is the number of samples contained in 2 periods of the previously mentioned sinusoidal signal. Hence, in this representative embodiment, the number of digitized samples utilized in generating a phase and/or gain estimate comprises M*N=8 digitized samples. Although aspects of the invention do not limit the number of bits used to generate the digitized samples, in a representative embodiment, 6 bits are used to generate the digitized samples. As a consequence, the one or more values provided by each of the digitized samples has 6 bits of resolution, allowing its values to vary from −32 to +31.

Figure 3:
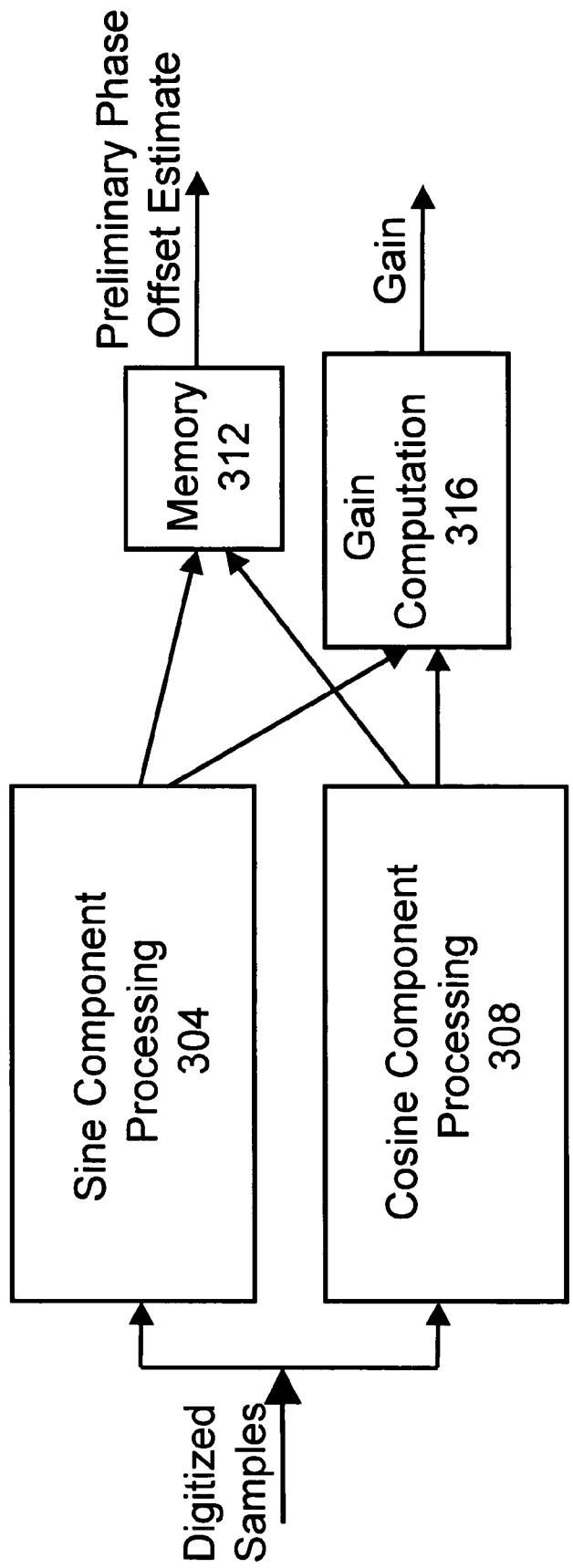
FIG. 3 is a block diagram of a subsystem, in a read channel receiver or a hard disk drive, that computes estimates of the preliminary phase offset and gain, for one or more sets of consecutive preamble samples, in accordance with an embodiment of the invention.

FIG. 3 is a block diagram of a subsystem, in a read channel receiver or a hard disk drive, that computes estimates of the preliminary phase offset and gain, for one or more sets of consecutive preamble samples, in accordance with an embodiment of the invention. The phase and gain computational subsystem, shown in FIG. 3, computes the preliminary phase offset and gain estimates by determining the sine and cosine projections using one or more digitized preamble samples. The phase and gain computational subsystem comprises a sine component (or projection) processing hardware/software 304, a cosine component processing hardware/software 308, a memory 312, and a gain computation hardware/software 316. The sine component processing hardware/software 304 and the cosine component processing hardware/software 308 each provide a projection of the exemplary eight samples, provided by y(k), either in the sine direction or the cosine direction. The sine component processing hardware/software 304 and the cosine component processing hardware/software 308 may each comprise a processor, such as a central processing unit, used to execute commands and/or perform digital computations. The sine component processing hardware/software 304 and the cosine component processing hardware/software 308 may each comprise any logic circuitry and/or set of executable instructions recognized by the processor, which is capable of computing its respective sine or cosine components (or projections). The set of executable instructions may be stored within the memory 312. In a representative embodiment, the logic circuitry and/or software computes the preliminary phase offset estimate by applying an equation (to be introduced as equation (6), later in this document), that utilizes the outputs provided by the sine component processing hardware/software 304 and cosine component processing hardware/software 308. In a representative embodiment, the memory 312 serves as a look up table in which the sine and cosine projections, computed by the sine component processing hardware/software 304 and cosine component processing hardware/software 308, may be appropriately mapped into a preliminary phase offset estimate, to be used by the frequency and phase offset computational subsystem, later shown in FIG. 4. The memory 312 may comprise a random operating memory or a non-volatile memory. It is contemplated that the memory 312 may comprise any circuitry capable of storing data in which one or more values may be appropriately indexed and/or mapped. The gain computation hardware/software 316 may comprise any logic circuitry and/or set of executable instructions (i.e., software) recognized by the processor, which is capable of computing the gain estimate. In a representative embodiment, the logic circuitry and/or software computes the gain estimate by applying an equation (to be introduced as equation (6), later in this document), that utilizes the outputs provided by the sine component processing hardware/software 304 and cosine component processing hardware/software 308. In a representative embodiment, the sine projection may be represented by the following set of equations:

$$P_{\sin}(k) \equiv \frac{2}{MN} \sum_{i=-MN/2+1}^{MN/2} y(k+i) \cdot \sin 2\pi\left(\frac{k+i}{N} + \frac{1}{8}\right) \quad (2)$$

$$= \frac{2}{MN} \sum_{i=-MN/2+1}^{MN/2} a \cdot \sin^2 2\pi\left(\frac{k+i}{N} + \frac{1}{8}\right)$$

$$\cos 2\pi\left(\Delta f(k+i) + \theta_0 - \frac{1}{8}\right) +$$

$$\frac{2}{MN} \sum_{i=-MN/2+1}^{MN/2} a \cdot \cos 2\pi\left(\frac{k+i}{N} + \frac{1}{8}\right)$$

$$\sin 2\pi\left(\frac{k+i}{N} + \frac{1}{8}\right)$$

$$\sin 2\pi\left(\Delta f(k+i) + \theta_0 - \frac{1}{8}\right) +$$

$$\frac{2}{MN} \sum_{i=-MN/2+1}^{MN/2} n_0(k+i) \cdot \sin 2\pi\left(\frac{k+i}{N} + \frac{1}{8}\right)$$

$$= \left\{ \frac{2a}{MN} \left[ \sum_{i=-MN/2+1}^{MN/2} \sin^2 2\pi\left(\frac{k+i}{N} + \frac{1}{8}\right) \right] \right.$$

$$\left. \cos 2\pi\left(\Delta fk + \theta_0 - \frac{1}{8}\right) + n_1(k) \right\} +$$

$$\left\{ \frac{2a}{MN} \left[ \sum_{i=-MN/2+1}^{MN/2} \cos 2\pi\left(\frac{k+i}{N} + \frac{1}{8}\right) \sin 2\pi\left(\frac{k+i}{N} + \frac{1}{8}\right) \right] \right.$$

$$\left. \sin 2\pi\left(\Delta fk + \theta_0 - \frac{1}{8}\right) + n_2(k) \right\} +$$

$$\frac{2}{MN} \sum_{i=-MN/2+1}^{MN/2} n_0(k+i) \cdot \sin 2\pi\left(\frac{k+i}{N} + \frac{1}{8}\right) =$$

$$a\cos 2\pi\left(\Delta fk + \theta_0 - \frac{1}{8}\right) + n_1(k) + n_2(k) + n_3(k)$$

Equation (2) is obtained by substituting equation (1) into $P_{sin}(k)$, for y(k). Equation (1) may be easily represented by the following equation:

$$y(k) = a \cdot \sin 2\pi\left(\frac{k}{N} + \frac{1}{8}\right) \cos 2\pi\left(\Delta fk + \theta_0 - \frac{1}{8}\right) +$$

$$a \cdot \cos 2\pi\left(\frac{k}{N} + \frac{1}{8}\right) \sin 2\pi\left(\Delta fk + \theta_0 - \frac{1}{8}\right) + n_0(k)$$

For each $k \geq MN/2-1$, M*N consecutive samples may be used to generate $P_{sin}(k)$, using $\{y(k-MN/2+1), \ldots, y(k+MN/2)\}$. The variables $n_1, n_2, n_3$ denote various noise components, resulting from white noise or the offset in frequency. Similarly, the cosine projection may be represented by the following set of equations:

$$P_{\cos}(k) \equiv \frac{2}{MN} \sum_{i=-MN/2+1}^{MN/2} y(k+i) \cdot \cos 2\pi\left(\frac{k+i}{N} + \frac{1}{8}\right) \quad (3)$$

$$= \frac{2}{MN} \sum_{i=-MN/2+1}^{MN/2} a \cdot \sin 2\pi\left(\frac{k+i}{N} + \frac{1}{8}\right)$$

$$\cos 2\pi\left(\frac{k+i}{N} + \frac{1}{8}\right) \cos 2\pi\left(\Delta f(k+i) + \theta_0 - \frac{1}{8}\right) +$$

$$\frac{2}{MN} \sum_{i=-MN/2+1}^{MN/2} a \cdot \cos^2 2\pi\left(\frac{k+i}{N} + \frac{1}{8}\right)$$

$$\sin 2\pi\left(\Delta f(k+i) + \theta_0 - \frac{1}{8}\right) +$$

$$\frac{2}{MN} \sum_{i=-MN/2+1}^{MN/2} n_0(k+i) \cdot \cos 2\pi\left(\frac{k+i}{N} + \frac{1}{8}\right)$$

$$= \left\{ \frac{2a}{MN} \left[ \sum_{i=-MN/2+1}^{MN/2} \sin 2\pi\left(\frac{k+i}{N} + \frac{1}{8}\right) \cos 2\pi\left(\frac{k+i}{N} + \frac{1}{8}\right) \right] \right.$$

$$\left. \cos 2\pi\left(\Delta fk + \theta_0 - \frac{1}{8}\right) + n_5(k) \right\} +$$

$$\left\{ \frac{2a}{MN} \left[ \sum_{i=-MN/2+1}^{MN/2} \cos^2 2\pi\left(\frac{k+i}{N} + \frac{1}{8}\right) \right] \right.$$

$$\left. \sin 2\pi\left(\Delta fk + \theta_0 - \frac{1}{8}\right) + n_6(k) \right\} +$$

$$\frac{2}{MN} \sum_{i=-MN/2+1}^{MN/2} n_0(k+i) \cdot \cos 2\pi\left(\frac{k+i}{N} + \frac{1}{8}\right) =$$

$$a\sin 2\pi\left(\Delta fk + \theta_0 - \frac{1}{8}\right) + n_5(k) + n_6(k) + n_7(k)$$

Again, equation (3) is obtained by substituting equation (1) into $P_{cos}(k)$, for y(k). The variables $n_5, n_6, n_7$ denote various noise components, resulting from white noise or the offset in frequency.

The phase estimate may be determined for the kth sample, where the phase at kth sample is given by $$\phi(k) = \Delta fk + \theta_0 - \frac{1}{8},$$

using the following equation:

$$Q(k) = \frac{P_{\cos}(k)}{P_{\sin}(k)} \approx \frac{a\sin 2\pi\phi(k) + n_7(k)}{a\cos 2\pi\phi(k) + n_3(k)} \equiv \tan 2\pi\phi(k) + n_Q(k) \quad (4)$$

The phase estimate may be found by taking the arctangent of Q(k), and may be represented by the following equation:

$$\hat{\phi}(k) = \frac{1}{2\pi} \arctan Q(k) = \phi(k) + n_\phi(k) \quad (5)$$

In practice, one may use a look-up table to calculate the arctangent function, using the memory, as shown in FIG. 3. The variables $n_Q(k)$ and $n_\phi(k)$ represent noise in each of equations (4) and (5).

In order to properly equalize the read channel, it may be necessary to determine one or more gain estimates or amplitude estimates using the preamble of the incoming digital samples. Aspects of the invention allow computation of a gain estimate by taking the square root of the sum of squares of the sine and cosine projections. The sine and cosine projections (or components) are referenced using equations (2) and (3). This may be represented by the following equation:

$$\tilde{a}(k) \equiv \sqrt{P_{\sin}(k)^2 + P_{\cos}(k)^2} \approx a + \cos 2\pi\phi(k)n_7(k) + \sin 2\pi\phi(k)n_3(k) \qquad (6)$$

As shown in equation (6), the amplitude or gain is found by calculating the square root of the sum of the squares of the sine and cosine projections.

Figure 4:
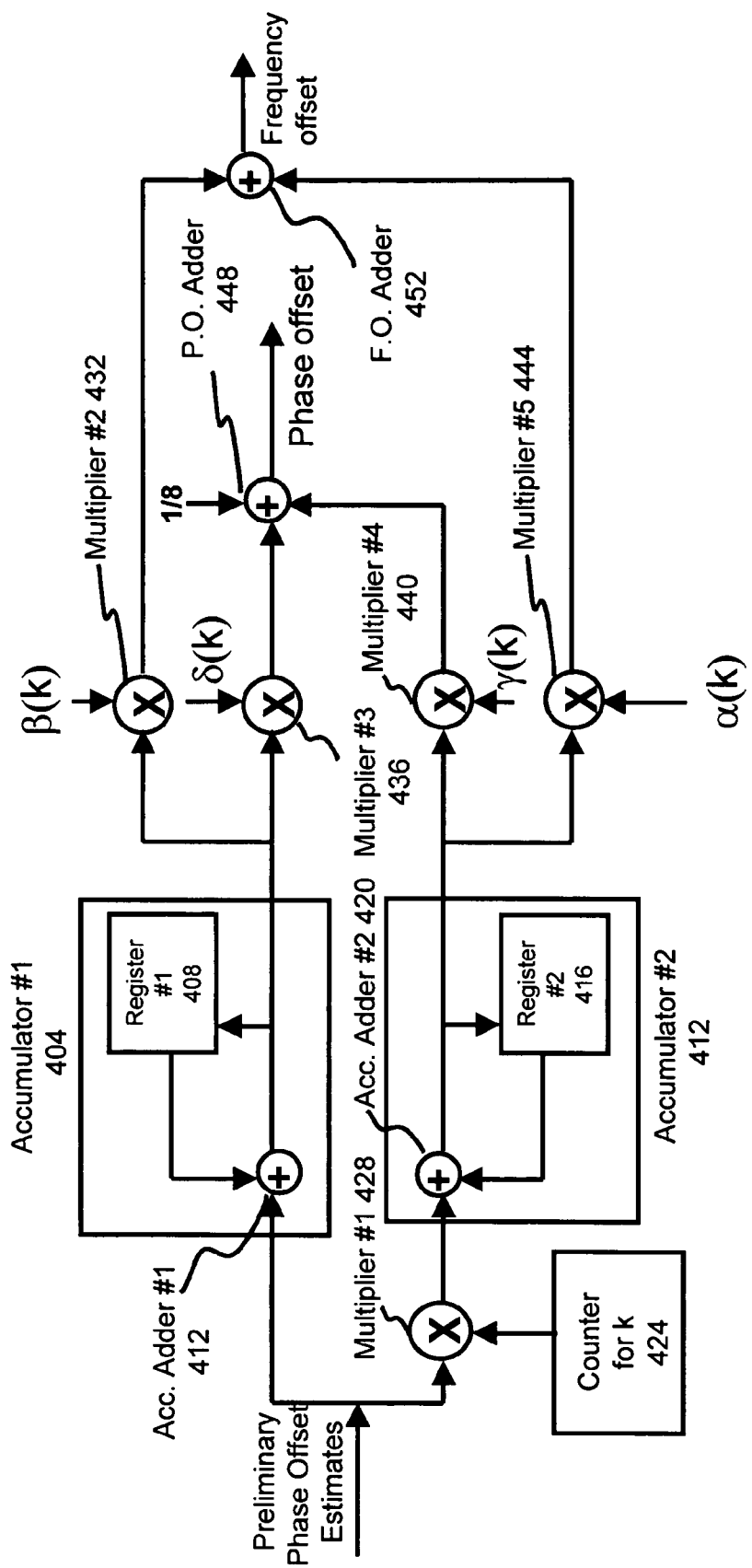
FIG. 4 is a block diagram of a subsystem of a read channel receiver that computes frequency and phase offsets used to synchronize the read channel receiver of a magnetic hard disk drive, in accordance with an embodiment of the invention.

FIG. 4 is a block diagram of a subsystem of a read channel receiver that computes frequency and phase offsets used to synchronize the read channel receiver of a magnetic hard disk drive, in accordance with an embodiment of the invention. The frequency and phase computational subsystem, shown in FIG. 4, comprises a first accumulator 404, a second accumulator 412, a counter 424 for the integer variable, k, which indexes the one or more preliminary phase offset estimates that are input, a first multiplier 428, a second multiplier 432, a third multiplier 436, a fourth multiplier 440, a fifth multiplier 444, a phase offset adder 448, and a frequency offset adder 452. The first accumulator 404 comprises a first accumulator adder 412 and a first register 408 while the second accumulator 412 comprises a second accumulator adder 420 and a second register 416. The first accumulator 404 accumulates (or provides a cumulative sum of) preliminary phase offset estimates provided by the phase and gain computational subsystem. The second accumulator 412 accumulates successive terms and functionally operates similar to that of the first accumulator 404. The two factors that generate the successive terms (product of two factors) comprise a count of the counter 424 and its associated preliminary phase offset estimate. Of course, the first adder 412 within the first accumulator 404 adds the preliminary phase offset estimate to the accumulated value stored in the first register 408. Likewise, the second adder 416 within the second accumulator 412 adds the terms (associated with the product of the preliminary phase offset estimate and the count) to the accumulated value stored in the second register 416. The values stored in the accumulators 404, 412 are used to compute the frequency and phase offsets. The frequency offset is computed by summing two products, a first product and a second product. The first product is obtained by multiplying the value in the first accumulator 404 with β(L) while the second product is obtained by multiplying the value in the second accumulator 412 with α(L). The phase offset is computed by summing two products (a third product and a fourth product) and a constant. The third product is obtained by multiplying the value in the first accumulator 404 with δ(L) while the fourth product is obtained by multiplying the value in the second accumulator 412 with γ(L). The third product, fourth product, and a constant (⅛ in this representative embodiment) are added to generate the phase offset. The aforementioned counter, adders, multipliers, and registers may be implemented using digital logic circuitry.

Aspects of the invention comprise utilizing a linear regression technique for determining the phase and frequency offsets of a read channel in a read channel receiver. The technique is employed in implementing the embodiment illustrated in FIG. 4. The objective of the linear regression technique is to find $\xi$ and $\zeta$ using a linear regression equation, such as $y_k \approx \xi x_k + \zeta$ for all k, given the set of points with coordinates $x=(x_1, x_2, \ldots, x_L)^T$ and $y=(y_1, y_2, \ldots, y_L)^T$. More precisely, the variables, $\xi$ and $\zeta$ are found that minimizes the L-2 norm of the error. The error may be written in vector form as $F(\xi, \zeta) = \|y - \xi x - \zeta\|^2 = (y - \xi x - \zeta)^T(y - \xi x - \zeta)$. The function $F(\xi, \zeta)$ is a quadraatic function in $\xi$ and $\zeta$ so to find the minimum it is sufficient to take the partial derivatives and set them to zero. The partial derivatives of $F(\xi, \zeta)$ with respect to $\xi$ and $\zeta$ are as follows:

$$\frac{\partial F}{\partial \xi} = -2x^T(y - \xi x - \zeta) \quad \frac{\partial F}{\partial \zeta} = -2I_{1 \times L}(y - \xi x - \zeta)$$

The resulting equations after setting the partial derivatives to zero are as follows:

$$\frac{\partial F}{\partial \xi} = -2x^T(y - \xi x - \zeta) = 0, \quad \frac{\partial F}{\partial \zeta} = -2I_{1 \times L}(y - \xi x - \zeta) = 0$$

The equations may be re-written as follows:

$$\begin{cases} x^T y - (x^T x)\xi - (x^T I_{L \times 1})\zeta = 0 \\ I_{1 \times L} y - (I_{1 \times L} x)\xi - (I_{1 \times L} I_{L \times 1})\zeta = 0 \end{cases} \qquad (7)$$

where $I_{1 \times L}$ denotes a 1 by L vector of all ones. The equations, after rearranging, may be re-written in matrix form as follows:

$$\begin{pmatrix} \xi \\ \zeta \end{pmatrix} = \begin{pmatrix} x^T x & x^T I_{L \times 1} \\ I_{1 \times L} x & L \end{pmatrix}^{-1} \begin{pmatrix} x^T y \\ I_{1 \times L} y \end{pmatrix} \qquad (8)$$

In a representative embodiment, the vector x comprises sampling times. In a representative embodiment, the sampling times comprises fixed sampling intervals. Hence, for example, the vector x may comprise $x = (1, \ldots, L)^T$, where L corresponds to the number of samples used in the linear regression technique (i.e., number of preliminary phase estimates used to compute a frequency offset and a phase offset). The inverse of the matrix shown in equation (8) only depends on the variable, L, and does not depend on y, and as a result, may be determined in advance. The terms within the invertible 2×2 matrix of equation (8) may be represented by the following equation:

$$\begin{pmatrix} \xi \\ \zeta \end{pmatrix} = \begin{pmatrix} \alpha(L) & \beta(L) \\ \gamma(L) & \delta(L) \end{pmatrix} \begin{pmatrix} x^T y \\ I_{1 \times L} y \end{pmatrix} \qquad (9)$$

As shown in equation (9), the terms in the 2×2 matrix of equation (9), α(L), β(L), γ(L), and δ(L), are all functions of the predetermined variable L. These terms may be obtained by inverting the 2×2 matrix shown in equation (8). The 2×1 matrix, $$\left(\begin{array}{c}x^T y \\ I_{1 \times L} y\end{array}\right),$$

of equation (9) may be implemented using two registers, as shown in equations (10a) and (10b).

$$R_{xy}(k)=R_{xy}(k-1)+ky_k, \quad (10a)$$

$$R_y(k)=R_y(k-1)+y_k \quad (10b)$$

This leads to a simple implementation for determining $\xi$ and $\zeta$, when $R_{xy}$ and $R_y$ are substituted into $$\left(\begin{array}{c}x^T y \\ I_{1 \times L} y\end{array}\right).$$

In this representative embodiment, the two registers, $R_{xy}$ and $R_y$ are substituted into the matrix equation (9). The matrix equation (9) may be expanded into the following two equations (11a) and (11b):

$$\xi = \alpha R_{xy} + \beta R_y, \quad (11a)$$

$$\zeta = \gamma R_{xy} + \delta R_y \quad (11b)$$

Recalling that $$\phi(k) = \Delta f k + \theta_0 - \frac{1}{8},$$

one may apply the aforementioned linear regression equation, $y_k \approx \xi x_k + \zeta$ for all k, to solve for $\Delta f$ and $\theta_0$. Using equations (10a) and (10b), and applying the sequence of preliminary phase offset estimates, $\hat{\phi}(1), \hat{\phi}(2), \ldots, \hat{\phi}(L)$ provided by the phase and gain computational circuitry, the following equations are obtained, in which $\Delta \hat{f}(L)$ corresponds to the frequency offset while $\hat{\theta}_0(L)$ corresponds to the phase offset:

$$R_{xy}(k)=R_{xy}(k-1)+k\hat{\phi}(k) \quad (12a)$$

$$R_y(k)=R_y(k-1)+\hat{\phi}(k) \quad (12b)$$

$$\Delta \hat{f}(k) = \alpha(k) R_{xy} + \beta(k) R_y \quad (13a)$$

$$\hat{\theta}_0(k) = \frac{1}{8} + \gamma(k) R_{xy} + \delta(k) R_y \quad (13b)$$

$$R_{xy}(0)=0, R_y(0)=0 \quad (14)$$

In this representative embodiment, the equations may be used to implement a system that allows one to determine the values for $\Delta \hat{f}(k)$ and $\hat{\theta}_0(k)$ (mathematical terminology representing the estimates for the frequency and phase offsets, respectively) for any value of k={1, 2, 3, ... L}. As a consequence, the embodiment provides an implementation that adjusts to a maximum number of digital samples, L, as one or more preambles of one or more disk sectors are input into the read channel of a magnetic hard disk drive.

Equations (12a) and (12b) represent the implementation of the first portion of FIG. 4 while equations (13a) and (13b) represent the implementation of the second portion of FIG. 4. Equations (14a) and (14b) indicate that the registers, $R_{xy}$ and $R_y$ used to implement the embodiment shown in FIG. 4, are initialized with value 0 when k=0.

Figure 5:
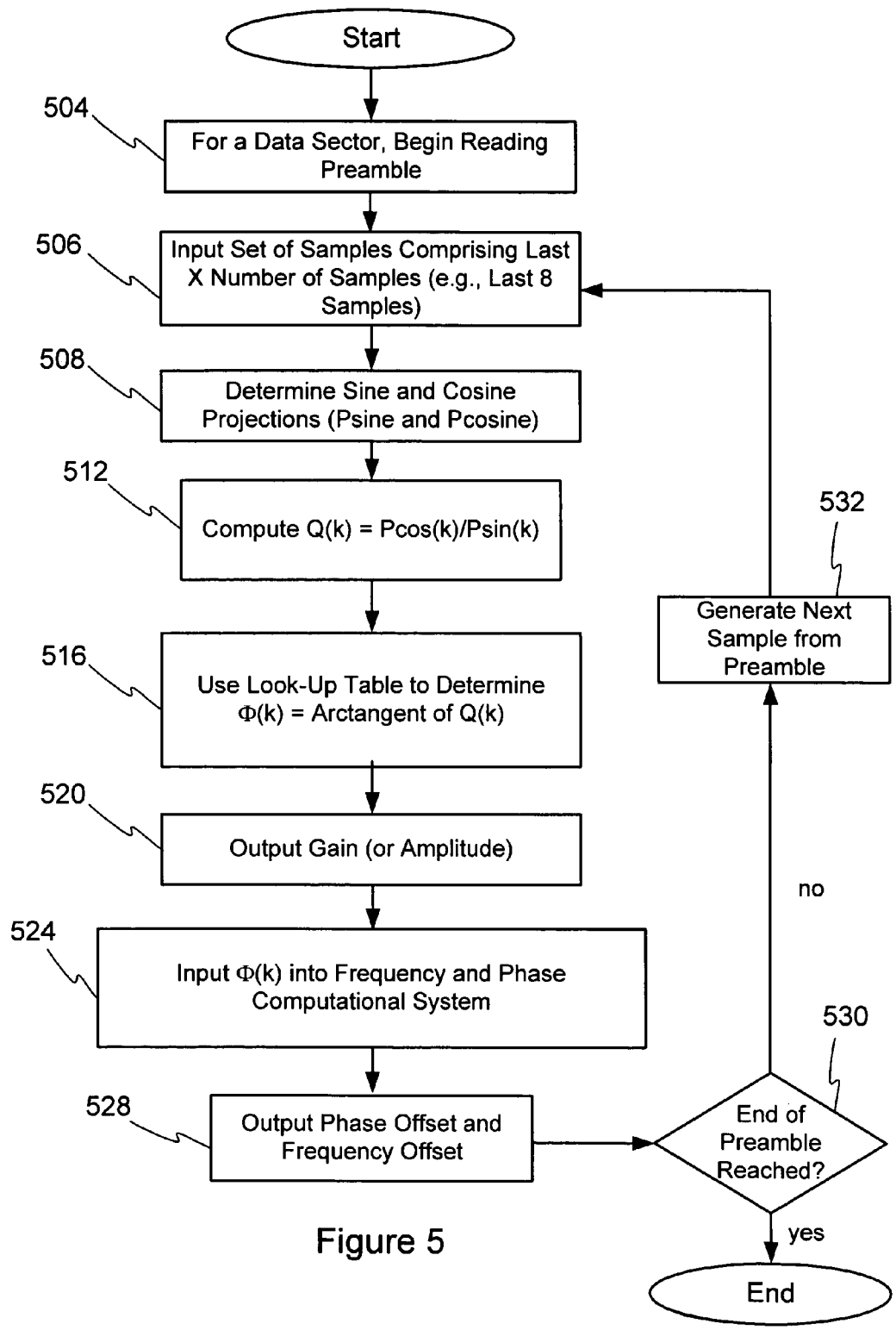
FIG. 5 is an operational flow diagram illustrating a method of generating frequency offset, phase offset, and gain (or amplitude) of a data stream read by a read channel receiver of a hard disk drive, in accordance with an embodiment of the invention.

FIG. 5 is an operational flow diagram illustrating a method of generating frequency offset, phase offset, and gain (or amplitude) of a data stream read from data stored in a data sector, by a read channel receiver of a hard disk drive, in accordance with an embodiment of the invention. At step 504, a preamble is read from the data sector of one or more data sectors in a hard disk drive. The one or more bytes contained within the preamble is used to generate the frequency offset, phase offset, and gain of the data stream. In a representative embodiment, the number of bytes used in the preamble is less than the typical number of bytes used—15 bytes. After processing and conditioning is performed on the sinusoidal output generated by the read channel receiver in the hard disk drive, a sequence of digitized samples is provided to the phase and gain computational subsystem. As was referenced in the embodiment of FIG. 2, a processing/conditioning circuitry performs the processing and conditioning. The sequence of digitized samples comprises the latest fixed number of digitized samples. At step 506, the last fixed number of digitized samples is provided to the phase and gain computational subsystem. In a representative embodiment, this fixed number, x, comprises the number of samples used to determine the sine and cosine projections using the phase and gain computational subsystem. In a representative embodiment, the value for the fixed number, x, is 8. This fixed number may be programmed by a user, prior to performing the computations provided by the phase and gain computational subsystem. At step 508, the phase and gain computational subsystem determines the sine and cosine projections (or sine and cosine components) based on the sequence of digitized samples provided. Equations (2) and (3) are used to compute these projections. At step 512, Q(k) the quotient is computed for P cos(k)/P sin(k). At step 516, a look-up table (implemented in memory, for example) is used to determine the arctangent of Q(k), Φ(k). At step 520, the gain or amplitude is output by the phase and gain computational subsystem, for use by the hard disk drive. At step 524, the phase and gain computational subsystem outputs Φ(κ) (preliminary phase offset estimates) into the frequency and phase computational subsystem, in which, the processing described in reference to FIG. 4, is accomplished. Finally, at step 528, the frequency and phase computational subsystem outputs the phase and frequency offsets associated with the sequence of samples provided to the frequency and phase computational subsystem. Next, at step 530, an assessment is made whether the last sample has been generated by the preamble. If the end of the preamble of the data sector has been sampled, then the process ends for this particular data sector. Thereafter, a new data sector may be read, if necessary, which contains another preamble. If a new data sector is read, then the process commences with another cycle, starting at step 504. Otherwise, the process resumes with step 532, at which, the next digitized sample is introduced at the next sample clock, using the remaining un-sampled preamble data. Then, the process repeats itself at step 504, when a new sequence of digitized samples is introduced to the phase and gain computational subsystem. In this exemplary embodiment, 7 of the previous 8 samples are used in the next sequence of samples. The 7 previously used samples are shifted by one sample clock, so as to accommodate the latest new sample.

In one or more embodiments, additional performance improvements may be obtained by utilizing knowledge of noise statistics and applying this to the noise variables previously used in the preceding equations. The performance improvements rely on an analysis of the noise variables $n_1$, $n_2$, $n_3$, $n_5$, $n_6$, and $n_7$ used in equations (2) and (3). For example, Bayesian Linear Regression may be employed when a priori knowledge of the frequency offset distribution is used. In another example, Colored Noise Linear Regression may be employed when noise correlation is taken into account while performing a linear regression.

The following set of equations provides a description of the noise variables, $n_1$ and $n_2$, in reference to equation (2) previously described.

$$n_1(k) \approx \frac{2}{MN} \sum_{i=-MN/2+1}^{MN/2} a \cdot \sin^2 2\pi\left(\frac{k+i}{N} + \frac{1}{8}\right)\left[\cos 2\pi\left(\Delta fk + \theta_0 - \frac{1}{8}\right) - \sin 2\pi\left(\Delta fk + \theta_0 - \frac{1}{8}\right) \cdot 2\pi\Delta fi\right] -$$

$$\frac{2}{MN} \sum_{i=-MN/2+1}^{MN/2} a \cdot \sin^2 2\pi\left(\frac{k+i}{N} + \frac{1}{8}\right)\cos 2\pi\left(\Delta fk + \theta_0 - \frac{1}{8}\right) =$$

$$\frac{2}{MN}(-2\pi\Delta fa)\left[\sum_{i=-MN/2+1}^{MN/2} i \cdot \sin^2 2\pi\left(\frac{k+i}{N} + \frac{1}{8}\right)\right]\sin 2\pi\left(\Delta fk + \theta_0 - \frac{1}{8}\right) =$$

$$\frac{2}{MN}(-2\pi\Delta fa)d_1(k)\sin 2\pi\left(\Delta fk + \theta_0 - \frac{1}{8}\right)$$

$$n_2(k) \approx \frac{2}{MN}(2\pi\Delta fa)\left[\sum_{i=-MN/2+1}^{MN/2} i \cdot \cos 2\pi\left(\frac{k+i}{N} + \frac{1}{8}\right)\sin 2\pi\left(\frac{k+i}{N} + \frac{1}{8}\right)\right]\cos 2\pi\left(\Delta fk + \theta_0 - \frac{1}{8}\right) =$$

$$\frac{2}{MN}(2\pi\Delta fa)d_2(k)\cos 2\pi\left(\Delta fk + \theta_0 - \frac{1}{8}\right)$$

$d_1(k)$ and $d_2(k)$ may be calculated as:

$$d_1(k) = \frac{2}{MN}(-1)\sum_{i=-MN/2+1}^{MN/2} i \cdot \frac{1}{2}\left[1 - \cos 4\pi\left(\frac{k+i}{N} + \frac{1}{8}\right)\right] =$$

$$b\cos 2\pi\left(\frac{2k}{N} + \theta_d\right) - \frac{1}{2}d_2(k) =$$

$$\frac{2}{MN}\sum_{i=-MN/2+1}^{MN/2} i \cdot \frac{1}{2}\sin 4\pi\left(\frac{k+i}{N} + \frac{1}{8}\right) = b\sin 2\pi\left(\frac{2k}{N} + \theta_d\right)$$

where b and $\theta_d$ are constant w.r.t. k and almost constant within a range of M and N:

Further, for b(M,N): b(1,4)=b(1,8)=b(2,4)=b(2,8)=½; b(1,16)=b(2,16)≈1.2

Hence, $$n_1(k) + n_2(k) =$$

$$-\pi\Delta fa\sin 2\pi\left(\Delta fk + \theta_0 - \frac{1}{8}\right) + 2\pi\Delta fab\sin 2\pi\left(\left(\frac{2}{N} + \Delta f\right)k + \theta_d + \theta_0 - \frac{1}{8}\right),$$

which is negligible since $\Delta f \ll \sigma_{n_0}$. $\sigma_{N_0}$ is the covariance of $n_0(k)$.

Similarly, the following set of equations provides a description of the noise variables, $n_3$ and $n_4$, in relation to equation (3) previously described.

$$n_5(k) \approx \frac{2}{MN} 2\pi\Delta fad_3(k)\sin 2\pi\left(\Delta fk + \theta_0 - \frac{1}{8}\right)$$

$$n_6(k) \approx \frac{2}{MN} 2\pi\Delta fad_4(k)\cos 2\pi\left(\Delta fk + \theta_0 - \frac{1}{8}\right)$$

$$d_3(k) = -b\sin 2\pi\left(\frac{2k}{N} + \theta_d\right)$$

$$d_4(k) = b\cos 2\pi\left(\frac{2k}{N} + \theta_d\right) + \frac{1}{2}$$

Hence, $$n_5(k) + n_6(k) = -\pi\Delta fa \cos 2\pi\left(\Delta fk + \theta_0 - \frac{1}{8}\right) + 2\pi\Delta fab \cos 2\pi\left(\left(\frac{2}{N} + \Delta f\right)k + \theta_d + \theta_0 - \frac{1}{8}\right)$$

is also negligible when $\Delta f \ll \sigma_{n_0}$.

The following set of equations provides a description of the noise variable $n_3$:

As previously discussed, $$n_3(k) = \frac{2}{MN}\sum_{i=-MN/2+1}^{MN/2} n_0(k+i) \cdot \sin 2\pi\left(\frac{k+i}{N} + \frac{1}{8}\right).$$

Assuming $n_0$ is AWGN (additive white Gaussian noise), then $n_3$ is zero-mean Gaussian. The correlation matrix of $n_3$ is as follows:

$$r_{n_3}(k, k-l) \equiv E[n_3(k)n_3(k-l)] =$$

$$E\left[\frac{2}{MN}\sum_{i=-MN/2+1}^{MN/2} n_0(k+i) \cdot \sin 2\pi\left(\frac{k+i}{N} + \frac{1}{8}\right) \cdot \frac{2}{MN}\sum_{i=-MN/2+1}^{MN/2} n_0(k+j) \cdot \sin 2\pi\left(\frac{k+i}{N} + \frac{1}{8}\right)\right] =$$

$$\left(\frac{2}{MN}\right)^2 \sigma_{n_0}^2 \left[\sum_{\substack{-MN/2+1 \le i \le MN/2 \\ -MN/2+1 \le j = i+l \le MN/2}} \sin^2 2\pi\left(\frac{k+i}{N} + \frac{1}{8}\right)\right] =$$

$$\left(\frac{2}{MN}\right)^2 \sigma_{n_0}^2 \left[\sum_{i=-MN/2+1}^{MN/2} \sin^2 2\pi\left(\frac{k+i}{N} + \frac{1}{8}\right) - \sum_{\substack{l \ge 0: MN/2-|l|+1 \le i \le MN/2 \\ l<0: -MN/2+1 \le i \le -MN/2+|l|}} \sin^2 2\pi\left(\frac{k+i}{N} + \frac{1}{8}\right)\right](|l| \le MN-1) =$$

$$\sigma_{n_0}^2 \left[\frac{2}{MN} - \left(\frac{2}{MN}\right)^2 \sum_{\substack{l \ge 0: MN/2-|l|+1 \le i \le MN/2 \\ l<0: -MN/2+1 \le i \le -MN/2+|l|}} \sin^2 2\pi\left(\frac{k+i}{N} + \frac{1}{8}\right)\right]$$

$$(|l| \le MN - 1) r_{n_3}(k, k-l) = 0 \text{ (otherwise)}$$

When N=4 as may be found used in one or more embodiments of the present invention, $r_{n_3}(k, k-l)$ is constant w.r.t. k:

$$r_{n_3}(k, k-l) = \begin{cases} \sigma_{n_0}^2 \frac{2}{MN}\left(1 - \frac{|l|}{MN}\right), & |l| \le MN-1 \\ 0 & |l| \ge MN \end{cases}$$

The correlation function takes a similar form:

$$Fr_{n_3}(l; L) \equiv E\left[\frac{1}{L}\sum_{k=0}^{L-1} n_3(k)n_3(k-l)\right] = \frac{1}{L}\sum_{k=0}^{L-1} r_{n_3}(k, l)$$

$$= \begin{cases} \sigma_{n_0}^2 \left[\frac{2}{MN} - \left(\frac{2}{MN}\right)^2 \sum_{\substack{l\geq 0: MN/2-|l|+1\leq i\leq MN/2 \\ l<0: -MN/2+1\leq i\leq -MN/2+|l|}} \left(\frac{1}{L}\sum_{k=0}^{L-1}\sin^2 2\pi\left(\frac{k+i}{N}+\frac{1}{8}\right)\right)\right], & (|l| \leq MN-1) \\ 0, & |l| \geq MN \end{cases}$$

$$\approx \begin{cases} \sigma_{n_0}^2 \left[\frac{2}{MN} - \left(\frac{2}{MN}\right)^2 \sum_{\substack{l\geq 0: MN/2-|l|+1\leq i\leq MN/2 \\ l<0: -MN/2+1\leq i\leq -MN/2+|l|}} \left(\frac{1}{2}\right)\right], & |l| \leq MN-1 \\ 0, & |l| \geq MN \end{cases} \quad \begin{array}{l}(\text{iff } L\gg N/2; \\ \text{or } L = iN/2, i \in I)\end{array}$$

$$= \begin{cases} \sigma_{n_0}^2 \frac{2}{MN}\left(1 - \frac{|l|}{MN}\right), & |l| \leq MN-1 \\ 0, & |l| \geq MN \end{cases}$$

The variable, L, comprises the total number of samples provided by the preamble of the data sector. The noise power density spectrum may be obtained by taking the fast Fourier transform of the correlation function as follows:

$$N_3(k_\omega) = \text{FFT}(Fr_{n_3}(l))$$

It may be shown that $$\sum_{k_\omega} N_3(k_\omega) = Fr_{n_3}(0) = \sigma_{n_0}^2 \frac{2}{MN} \propto \frac{1}{MN},$$

which indicates that a reduction in the sine projection noise is proportional to the product M*N. Hence, aspects of the invention may incorporate values for N and M that provide embodiments having significantly reduced projection noise.

Another interesting property is that the dc noise is invariant w.r.t. M*N:

$$N_3(0) = \sum_i Fr_{n_3}(l) \equiv \sigma_{n_0}^2$$

As may be expected, the correlation matrix of $n_7$ in formula (3) is similar to that of $n_3$:

$$r_{n_7}(k, k-l) =$$

$$\begin{cases} \sigma_{n_0}^2 \left[\frac{2}{MN} - \left(\frac{2}{MN}\right)^2 \sum_{\substack{l\geq 0: MN/2-|l|+1\leq i\leq MN/2 \\ l<0: -MN/2+1\leq i\leq -MN/2+|l|}} \cos^2 2\pi\left(\frac{k+i}{N}+\frac{1}{8}\right)\right], & |l| \leq MN-1 \\ 0, & |l| \geq MN \end{cases}$$

When N=4, $r_{n_7}(k, k-l)$ is constant w.r.t. k:

$$r_{n_7}(k, k-l) = \begin{cases} \sigma_{n_0}^2 \frac{2}{MN}\left(1 - \frac{|l|}{MN}\right), & |l| \leq MN-1 \\ 0, & |l| \geq MN \end{cases} = r_{n_3}(k, k-l)$$

Hence, $Fr_{n_3}(0) = Fr_{n_7}(0)$.

When performing a preliminary phase offset estimate as indicated by way of equation (4), the noise properties may be derived as follows:

$$\frac{\partial Q(k)}{\partial n_3(k)}\bigg|_{\substack{P_{\sin(k)}=a\cos 2\pi\phi(k) \\ P_{\cos(k)}=a\sin 2\pi\phi(k)}} = -\frac{\sin 2\pi\phi(k)}{a\cos^2 2\pi\phi(k)}$$

$$\frac{\partial Q(k)}{\partial n_7(k)}\bigg|_{\substack{P_{\sin(k)}=a\cos 2\pi\phi(k) \\ P_{\cos(k)}=a\sin 2\pi\phi(k)}} = -\frac{1}{a\cos 2\pi\phi(k)}$$

$$n_Q(k) = -\frac{\sin 2\pi\phi(k)}{a\cos^2 2\pi\phi(k)}n_3(k) + \frac{1}{a\cos 2\pi\phi(k)}n_7(k)$$

Recall that the preliminary phase offset estimate is given by $$\hat{\phi}(k) \equiv \frac{1}{2\pi}\arctan Q(k) = \phi(k) + n_\phi(k).$$

Therefore, $$n_\phi(k) \approx \frac{1}{2\pi}\cos^2 2\pi\phi(k)n_Q(k) \approx \frac{1}{2\pi a}(-\sin 2\pi\phi(k)n_3(k) + \cos 2\pi\phi(k)n_7(k))$$

And its correlation matrix is given by:

$$r_{n_\phi}(k, k-l) \equiv E[n_\phi(k)n_\phi(k-l)] \approx$$
$$\left(\frac{1}{2\pi a}\right)^2 (\sin 2\pi\phi(k)\sin 2\pi\phi(k-l)r_{n_3}(k, k-l) +$$
$$\cos 2\pi\phi(k)\cos 2\pi\phi(k-l)r_{n_7}(k, k-l)$$

In above equation, the near-zero cross-correlation property of $n_3$ and $n_7$ is utilized, which may be proven by way of the following equations:

$$xr_{n_3,n_7}(k, k-l) \equiv E[n_3(k)n_7(k-l)] =$$

$$E\left[\frac{2}{MN}\sum_{i=-MN/2+1}^{MN/2} n_0(k+i) \cdot \sin 2\pi\left(\frac{k+i}{N} + \frac{1}{8}\right) \cdot\right.$$

$$\left.\frac{2}{MN}\sum_{j=-MN/2+1}^{MN/2} n_0(k+j) \cdot \cos 2\pi\left(\frac{k+j}{N} + \frac{1}{8}\right)\right] =$$

$$\left(\frac{2}{MN}\right)^2 \sigma_{n_0}^2 \left[\sum_{\substack{-MN/2+1 \le i \le MN/2 \\ -MN/2+1 \le j = i+l \le MN/2}} \frac{1}{2}\sin 4\pi\left(\frac{k+i}{N} + \frac{1}{8}\right)\right] =$$

$$\begin{cases} \frac{2}{MN}\sigma_{n_0}^2 \left[\frac{1}{MN}\sum_{\substack{l \ge 0: 1 \le i \le MN-l \\ l < 0: 1-l \le i \le MN}} \sin 4\pi\left(\frac{k+i}{N} + \frac{1}{8}\right)\right], \\ 0, \end{cases}$$

$$\begin{array}{l} MN - N/2 \le |l| \le MN - 1 \\ |l| \le MN - 1 - N/2 \end{array} =$$

$$\begin{cases} \frac{2}{MN}\sigma_{n_0}^2\left(\frac{1}{MN}\cos k\pi\right), & |l| = MN - 1 \\ 0, & |l| < MN - 1 \end{cases} \text{(if } N=4\text{)} \approx 0$$

Thus, using the cross-correlation of $n_3$ and $n_7$ analysis (assuming that N=4, and $r_{n_3}=r_{n_7}$), the correlation of the noise associated with the preliminary phase offset estimate is given by:

$$r_{n_\phi}(k, k-l) = \frac{2}{MN}\sigma_0^2\left(1 - \frac{|l|}{MN}\right)\cos 2\pi\Delta fl \approx$$

$$\frac{2}{MN}\sigma_0^2\left(1 - \frac{|l|}{MN}\right) \text{ }(\Delta fl \ll 1)\text{where, } \sigma_0 = \frac{\sigma_{n_0}}{2\pi a}.$$

An estimate of the noise level may be based on the following, such that autocorrelation of $\tilde{a}(k)$ is zero when the delay is no larger than M*N:

$$\hat{\sigma}_{n_0}^2 \equiv \frac{MN}{4}\frac{1}{L-mn}\sum_{k=mn}^{L-1}(\tilde{a}(k) - \tilde{a}(k-mn))^2 \rightarrow$$

$$\frac{MN}{4}E[(\tilde{a}(k) - \tilde{a}(k-mn))^2] \approx$$

$$\frac{MN}{4}\left[\cos^2 2\pi\phi(k)\sigma_{n_7}^2 - \cos^2 2\pi\phi(k-mn)\sigma_{n_7}^2 + \right.$$

$$\left. \sin^2 2\pi\phi(k)\sigma_{n_3}^2 - \sin^2 2\pi\phi(k - mn)\sigma_{n_3}^2\right]\frac{MN}{4}2\sigma_{n_3}^2 \text{ } (\because N=4 \rightarrow \sigma_{n_3}^2 = \sigma_{n_7}^2, \text{ or, } \sigma_{n_3}^2 \approx \sigma_{n_7}^2)\sigma_{n_0}^2$$

In one or more embodiments, two alternative methods may be used for linear regression: linear regression with colored noise, and Bayesian linear regression. In the embodiment using linear regression with colored noise, when the correlation of phase estimation noise is considered, the log-likelihood of $\{n_\phi(k)\}$ becomes $F(\Delta f, \theta_0')=(\hat{\phi}-\Delta fk-\theta_0')^T R_{n_\phi}^{-1}(\hat{\phi}-\Delta fk-\theta_0')$, where bold variables comprise matrices or vectors:

$$R_{n_\phi}^{-1}=(r_{n_\phi}(k,k-l))_{k,k-l},\hat{\phi}=\{\phi(k)|k=0,\ldots,L-1\},$$
$$k=\{k|k=0,\ldots,L-\}$$

and $\theta_0'=\theta_0-\frac{1}{8}$.

From $\partial F(\Delta f, \theta_0')/\partial \Delta f=0$ and $\partial F(\Delta f,\theta_0')/\partial \theta_0'=0$, one obtains the matrix equations:

$$\begin{bmatrix} \Delta f \\ \theta_0 \end{bmatrix} = \begin{bmatrix} k^T R_{n_\phi}^{-1} k & k^T R_{n_\phi}^{-1} i_{n\times 1} \\ i_{n\times 1}^T R_{n_\phi}^{-1} k & i_{n\times 1}^T R_{n_\phi}^{-1} i_{n\times 1} \end{bmatrix}^{-1} \cdot \begin{bmatrix} k^T R_{n_\phi}^{-1} \hat{\phi} \\ i_{n\times 1}^T k^T R_{n_\phi}^{-1} \hat{\phi} \end{bmatrix} + \begin{bmatrix} 0 \\ 1/8 \end{bmatrix}$$

This formula replaces formulas (10), (11), (12), (13), and (14), previously described.

When prior information of $\Delta f$ and $\theta_0'$ is available, or the information has been adaptively learned real time, Bayesian linear regression may be employed. The likelihood function of the preliminary phase offset estimate is given by:

$$l(f, \theta_0'; \hat{\varphi}) = p(\hat{\varphi} | \Delta f, \theta_0') =$$
$$(2\pi)^{-L/2}(\det R_{n_\varphi})^{-1}\exp\left(-(\hat{\varphi} - \Delta fk - \theta_0')^T R_{n_\varphi}^{-1}(\hat{\varphi} - \Delta fk - \theta_0')/2\right)$$

The preceding equation uses a Gaussian distribution for $\Delta f$ and an even distribution results for $\theta_0'$:

$$p_{\Delta \hat{f},\hat{\theta}_0'}(\Delta f, \theta_0') = \frac{1}{\sqrt{2\pi}\sigma_{\Delta f}}\exp\left(-\frac{(\Delta f)^2}{\sigma_{\Delta f}^2}\right) \cdot p_{\hat{\theta}_0'}(\theta_0'),$$

where $$p_{\hat{\theta}_0'}(\theta_0') = \begin{cases} 1 & |\theta_0'| < 1/2 \\ 0 & |\theta_0'| >= 1/2 \end{cases}$$

is the probability density function of the initial phase offset.

Thus, Bayesian estimation of $\Delta f$ is defined as:

$$\Delta \hat{f} \equiv \frac{\int_{\theta_0'}\int_{\Delta f} l(f, \theta_0'; \hat{\varphi}) p_{\Delta \hat{f},\hat{\theta}_0'}(\Delta \hat{f}, \theta_0') \cdot \Delta f \cdot d\Delta f d\theta_0'}{\int_{\theta_0'}\int_{\Delta f} l(f, \theta_0'; \hat{\varphi}) p_{\Delta \hat{f},\hat{\theta}_0'}(\Delta \hat{f}, \theta_0') \cdot d\Delta f d\theta_0'}$$

$$= \frac{\int_{\theta_0'}\left[\int_{\Delta f} \exp(a + b\Delta f + (c+h)(\Delta f)^2)\Delta f \cdot d\Delta f\right] \cdot d\theta_0'}{\int_{\theta_0'}\int_{\Delta f} \exp(a + b\Delta f + (c+h)(\Delta f)^2) \cdot d\Delta f d\theta_0'}$$

where
$$a = -(\hat{\varphi} - \theta_0')^T R_{n_\varphi}^{-1}(\hat{\varphi} - \theta_0')/2$$
$$b = k^T R_{n_\phi}^{-1}\hat{\varphi}(\hat{\varphi} - \theta_0')$$
$$c = k^T R_{n_\phi}^{-1} k/2$$
$$h = -\frac{1}{2\sigma_{\Delta f}^2}$$

In a representative embodiment, mathematical approximation ($\sigma 2_0^2 \ll 1$) yields the following concise formulations:

$$\Delta f = f\hat{\varphi}$$

$$f = -\frac{k^T R_{n_\varphi}^{-1}}{2(c+h)}\left(I_{n\times n} + \frac{R}{i_{1\times n} R i_{n\times 1}}\right)$$

$$R = R_{n_\varphi}^{-1} + \frac{R_{n_\varphi}^{-1} k k^T R_{n_\varphi}^{-1}}{2(c+h)}$$

In the event that $\sigma_0^2$ is stable in different sections, one or more old $\sigma_0^2$ values may be used to calculate f in advance. In the event f varies in different sections, $\sigma_0^2$ may be estimated in real-time and the formula may require a small adjustment yielding:

$$\Delta\hat{f} = \frac{f_1\hat{\varphi} + \gamma f_2\hat{\varphi}}{f_3 + \gamma f_4 + \gamma^2 f_5}, \gamma = \frac{\sigma_0^2}{\sigma_{\Delta f}^2},$$

wherein $f_1$, $f_2$, $f_3$, $f_4$, $f_5$ are constants.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method of synchronizing a read channel of a hard disk drive, in reference to data that is read by said read channel, said method comprising:
   first generating two or more preliminary phase estimates based on one or more preambles of one or more data sectors in said hard disk drive;
   second generating a frequency offset and a phase offset by applying linear regression to said two or more preliminary phase estimates; and
   using said frequency offset and said phase offset to perform said synchronizing, said frequency offset obtained using the equation:

$\Delta f(k) = \alpha(k)R_{xy} + \beta(k)R_y$, as determined by computing an inverse matrix, $$\begin{pmatrix} x^T x & x^T I_{L\times 1} \\ I_{1\times L} x & L \end{pmatrix}^{-1},$$

wherein $X = (1, \ldots, L)^T$, and $I_{L\times 1}$ comprises a L by 1 vector of ones, and $I_{1\times L}$ comprises a 1 by L vector of all ones, said $\alpha(k)$ comprises the row 1, column 1 term of said inverse matrix, and said $\beta(k)$ comprises the row 1, column 2 term of said inverse matrix, and wherein $R_{xy}$ is equal to $X^T$ multiplied by a vector comprising L of said two or more preliminary phase estimates and Ry is equal to $I_{1\times T}$ multiplied by said vector comprising L of said two or more preliminary phase estimates.

2. A method of synchronizing a read channel of a hard disk drive, in reference to data that is read by said read channel, said method comprising:
   first generating two or more preliminary phase estimates based on one or more preambles of one or more data sectors in said hard disk drive;
   second generating a frequency offset and a phase offset by applying linear regression to said two or more preliminary phase estimates; and
   using said frequency offset and said phase offset to perform said synchronizing, said phase offset obtained using the equation:

$$\hat{\theta}_0(k) = \frac{1}{8} + \gamma(k)R_{xy} + \delta(k)R_y,$$

as determined by computing an inverse matrix, $$\begin{pmatrix} x^T x & x^T I_{L\times 1} \\ I_{1\times L} x & L \end{pmatrix}^{-1},$$

wherein $X = (1, \ldots, L)^T$, and $I_{L\times 1}$ comprises a L by 1 vector of ones, and $I_{1\times L}$ comprises a 1 by L vector of all ones, said $\gamma(k)$ comprises the row 2, column 1 term of said inverse matrix, and said $\delta(k)$ comprises the row 2, column 2 term of said inverse matrix, and wherein $R_{xy}$ is equal to $X^T$ multiplied by a vector comprising L of said two or more preliminary phase estimates and Ry is equal to $I_{1\times L}$ multiplied by said vector comprising L of said two or more preliminary phase estimates.

3. A system for synchronizing a read channel of a hard disk drive, in reference to data that is read by said read channel, said system comprising:
   at least one circuitry for first generating two or more preliminary phase estimates based on one or more preambles of one or more data sectors in said hard disk drive, for second generating a frequency offset and a phase offset by applying linear regression to said two or more preliminary phase estimates, and for using said frequency offset and said phase offset to perform said synchronizing, said frequency offset obtained using the equation:

$\Delta f(k) = \alpha(k)R_{xy} + \beta(k)R_y$, as determined by computing an inverse matrix, $$\begin{pmatrix} x^T x & x^T I_{L\times 1} \\ I_{1\times L} x & L \end{pmatrix}^{-1},$$

wherein $X = (1, \ldots, L)^T$, and $I_{L\times 1}$ comprises a L by 1 vector of ones, and $I_{1\times L}$ comprises a 1 by L vector of all ones, said $\alpha(k)$ comprises the row 1, column 1 term of said inverse matrix, and said $\beta(k)$ comprises the row 1, column 2 term of said inverse matrix, and wherein $R_{xy}$ is equal to $X^T$ multiplied by a vector comprising L of said two or more preliminary phase estimates and Ry is eciual to $I_{1\times L}$ multiplied by said vector comprising L of said two or more preliminary phase estimates.

4. A system for synchronizing a read channel of a hard disk drive, in reference to data that is read by said read channel, said system comprising:
   at least one circuitry for first generating two or more preliminary phase estimates based on one or more preambles of one or more data sectors in said hard disk drive, for second generating a frequency offset and a phase offset by applying linear regression to said two or more preliminary phase estimates, and for using said frequency offset and said phase offset to perform said synchronizing, said phase offset obtained using the equation:

$$\hat{\theta}_0(k) = \frac{1}{8} + \gamma(k)R_{xy} + \delta(k)R_y,$$

as determined by computing an inverse matrix, $$\begin{pmatrix} x^T x & x^T I_{L \times 1} \\ I_{1 \times L} x & L \end{pmatrix}^{-1},$$

wherein $X=(1, \ldots, L)^T$, and $I_{L \times 1}$ comprises a L by 1 vector of ones, and $I_{1 \times L}$ comprises a 1 by L vector of all ones, said $\gamma(k)$ comprises the row 2, column 1 term, of said inverse matrix, and said $\delta(k)$ comprises the row 2, column 2 term of said inverse matrix, and wherein $R_{xy}$ is equal to $X^T$ multiplied by a vector comprising L of said two or more preliminary phase estimates and Ry is equal to $I_{1 \times L}$ multiplied by said vector comprising L of said two or more preliminary phase estimates.

5. A method of determining a frequency offset and a phase offset during reading of a data sector of a hard disk drive, said method comprising:
   determining sine and cosine projections using a number of consecutive samples obtained from a preamble of said data sector of said hard disk drive;
   using said sine and cosine projections to generate two or more preliminary phase estimates; and
   using linear regression to generate said frequency offset and said phase offset using said two or more preliminary phase estimates, said sine projections described by the equation, $$P\sin(k) = a\cos 2\pi \left( \Delta f k + \theta_0 - \frac{1}{8} \right),$$

said frequency offset given by $\Delta f$ and said phase offset given by $\theta_0$, wherein k represents an integer variable that indexes said consecutive samples, while P sin(k) represents a sine projection of said consecutive samples.

6. A method of determining a frequency offset and a phase offset during reading of a data sector of a hard disk drive, said method comprising:
   determining sine and cosine projections using a number of consecutive samples obtained from a preamble of said data sector of said hard disk drive;
   using said sine and cosine projections to generate two or more preliminary phase estimates; and
   using linear regression to generate said frequency offset and said phase offset using said two or more preliminary phase estimates, said cosine projections described by the equation, $$P\cos(k) = a\sin 2\pi \left( \Delta f k + \theta_0 - \frac{1}{8} \right),$$

said frequency offset given by $\Delta f$ and said phase offset given by $\theta_0$, wherein k represents an integer variable that indexes said consecutive samples, while P cos(k) represents a cosine projection of said consecutive samples.

7. A system for determining a frequency offset and a phase offset during reading of a data sector of a hard disk drive, said system comprising:
   at least one circuitry for determining sine and cosine projections using a number of consecutive samples obtained from a preamble of said data sector of said hard disk drive, for using said sine and cosine projections to generate two or more preliminary phase estimates, and for using linear regression to generate said frequency offset and said phase offset using said two or more preliminary phase estimates, said sine projections described by the equation, $$P\sin(k) = a\cos 2\pi \left( \Delta f k + \theta_0 - \frac{1}{8} \right),$$

said frequency offset given by $\Delta f$ and said phase offset given by $\theta_0$, wherein k represents an integer variable that indexes said consecutive samples, while P sin(k) represents a sine projection of said consecutive samples.

8. A system for determining a frequency offset and a phase offset during reading of a data sector of a hard disk drive, said system comprising:
   at least one circuitry for determining sine and cosine projections using a number of consecutive samples obtained from a preamble of said data sector of said hard disk drive, for using said sine and cosine projections to generate two or more preliminary phase estimates, and for using linear regression to generate said frequency offset and said phase offset using said two or more preliminary phase estimates, said cosine projections described by the equation, $$P\cos(k) = a\sin 2\pi \left( \Delta f k + \theta_0 - \frac{1}{8} \right),$$

said frequency offset given by $\Delta f$ and said phase offset given by $\theta_0$, wherein k represents an integer variable that indexes said consecutive samples, while P cos(k) represents a cosine projection of said consecutive samples.

9. A method of determining a frequency offset and a phase offset during reading of a data sector of a hard disk drive, said method comprising:
   determining sine and cosine projections using a number of consecutive samples obtained from a preamble of said data sector of said hard disk drive;
   using said sine and cosine projections to generate two or more preliminary phase estimates; and
   using linear regression to generate said frequency offset and said phase offset using said two or more preliminary phase estimates, said generating two or more phase estimates accomplished by determining two or more quotients, each of said two or more quotients determined by dividing a corresponding cosine projection by a corresponding sine projection of said sine and cosine projections, wherein each of said two or more quotients, Q(k), is described by the following equation:

$Q(k) = \tan 2\pi \phi(k),$ wherein $$\phi(k) = \Delta f k + \theta_0 - \frac{1}{8},$$

wherein said frequency offset given by Δf and said phase offset given by $\theta_0$, wherein k represents an integer variable that indexes said consecutive samples.

10. The method of claim 9 further comprising determining two or more arctangents of said two or more quotients Q(k), said two or more arctangents providing said two or more preliminary phase offset estimates.

11. The method of claim 10 wherein said determining two or more arctangents is performed by using a look-up table stored in a memory of said hard disk drive.

12. The method of claim 10 further comprising processing said two or more preliminary phase estimates using one or more logic devices, said one or more logic devices comprising one or more registers, said one or more logic devices outputting said frequency offset, Δf, and said phase offset, $\theta_0$.

13. The method of claim 10 further comprising:
first adding each of said two or more preliminary phase offset estimates to a value stored in a first accumulator, said first accumulator accumulating a first sum associated with said two or more phase offset estimates;
incrementing a counter;
first multiplying each of said two or more preliminary phase offset estimates by a count value provided by said counter, wherein said first multiplying generates a first product;
second adding said first product to a second value stored in a second accumulator, said second accumulator accumulating a second sum associated with said two or more phase offset estimates;
second multiplying said first sum with a first factor to generate a second product;
third multiplying said second sum with a second factor to generate a third product; and
third adding said second product to said third product to generate said frequency offset.

14. The method of claim 13 further comprising:
fourth multiplying said first sum with a third factor to generate a fourth product;
fifth multiplying said second sum with a fourth factor to generate a fifth product; and
fourth adding said fourth product to said fifth product to generate said phase offset.

15. A system for determining a frequency offset and a phase offset during reading of a data sector of a hard disk drive, said system comprising:
at least one circuitry for:
determining sine and cosine projections using a number of consecutive samples obtained from a preamble of said data sector of said hard disk drive;
using said sine and cosine projections to generate two or more preliminary phase estimates; and
using linear regression to generate said frequency offset and said phase offset using said two or more preliminary phase estimates, said generating two or more phase estimates accomplished by determining two or more quotients, each of said two or more quotients determined by dividing a corresponding cosine projection by a corresponding sine projection of said sine and cosine projections, wherein each of said two or more quotients, Q(k), is described by the following equation:

$Q(k) = \tan 2\pi \phi(k)$, wherein $$\phi(k) = \Delta f k + \theta_0 - \frac{1}{8},$$

wherein said frequency offset given by Δf and said phase offset given by $\theta_0$, wherein k represents an integer variable that indexes said consecutive samples.

16. The system of claim 15 wherein said at least one circuitry is capable of determining two or more arctangents of said two or more quotients Q(k), said two or more arctangents providing said two or more preliminary phase offset estimates.

17. The system of claim 16 wherein said determining two or more arctangents is performed by using a look-up table stored in a memory of said hard disk drive.

18. The system of claim 16 wherein said at least one circuitry is capable of processing said two or more preliminary phase estimates and outputting said frequency offset, Δf, and said phase offset, $\theta_0$.

19. The system of claim 16 wherein said at least one circuitry is capable of:
first adding each of said two or more preliminary phase offset estimates to a value stored in a first accumulator, said first accumulator accumulating a first sum associated with said two or more phase offset estimates;
incrementing a counter;
first multiplying each of said two or more preliminary phase offset estimates by a count value provided by said counter, said first multiplying generating a first product;
second adding said first product to a second value stored in a second accumulator, said second accumulator accumulating a second sum associated with said two or more phase offset estimates, for second multiplying said first sum with a first factor to generate a second product;
third multiplying said second sum with a second factor to generate a third product; and
third adding said second product to said third product to generate said frequency offset.

20. The system of claim 19 wherein said at least one circuitry is capable of:
fourth multiplying said first sum with a third factor to generate a fourth product;
fifth multiplying said second sum with a fourth factor to generate a fifth product; and
fourth adding said fourth product to said fifth product to generate said phase offset.

21. A method of estimating the gain or amplitude of a data stream read by a read channel receiver of a hard disk drive comprising determining one or more sine and cosine projections of a number of consecutive samples of one or more preambles of one or more data sectors in said hard disk drive, said one or more sine and cosine projections computed using the following equations:

$$P\sin = a\cos 2\pi \left( \Delta f k + \theta_0 - \frac{1}{8} \right)$$

$$P\cos = a\sin 2\pi \left( \Delta f k + \theta_0 - \frac{1}{8} \right),$$

wherein said frequency offset is given by Δf and said phase offset is given by $\theta_0$, wherein k represents an integer variable that indexes said consecutive samples and wherein P sin and P cos represent a sine and cosine projections of said consecutive samples.

22. A system for estimating the gain or amplitude of a data stream read by a read channel receiver of a hard disk drive comprising:
at least one circuitry for determining one or more sine and cosine projections of a number of consecutive samples of one or more preambles of one or more data sectors in said hard disk drive, said one or more sine and cosine projections computed using the following equations:

$$P\sin = a\cos 2\pi\left(\Delta fk + \theta_0 - \frac{1}{8}\right)$$

$$P\cos = a\sin 2\pi\left(\Delta fk + \theta_0 - \frac{1}{8}\right),$$

wherein said frequency offset is given by $\Delta f$ and said phase offset is given by $\theta_0$, wherein k represents an integer variable that indexes said consecutive samples and wherein P sin and P cos represent a sine and cosine projections of said consecutive samples.

23. A method of estimating the gain or amplitude of a data stream read by a read channel receiver of a hard disk drive comprising determining one or more sine and cosine projections of a number of consecutive samples of one or more preambles of one or more data sectors in said hard disk drive, wherein said gain or amplitude, $\alpha(k)$, is computed using the following equation:

$$\alpha(k) \equiv \sqrt{P_{\sin}(k)^2 + P_{\cos}(k)^2},$$

wherein k represents an integer variable that indexes one or more digital samples of said data stream, while $P_{sin}(k)$ and $P_{cos}(k)$ represent sine a cosine projections, respectively, of said data stream.

* * * * *